United States Patent [19]

Kassem

[11] Patent Number: 4,949,523

[45] Date of Patent: * Aug. 21, 1990

[54] NON-PENETRATING ELASTOMERIC MEMBRANE ANCHORING SYSTEM

[76] Inventor: Gary M. Kassem, Margaret and McKee Sts., McKee Rocks, Pa. 15136

[*] Notice: The portion of the term of this patent subsequent to Aug. 22, 2006 has been disclaimed.

[21] Appl. No.: 366,500

[22] Filed: Jun. 15, 1989

Related U.S. Application Data

[63] Continuation-in-part of Ser. No. 172,762, Mar. 28, 1988, Pat. No. 4,858,412.

[51] Int. Cl.5 ............................................. E04D 5/14
[52] U.S. Cl. ........................................ 52/713; 52/710;
52/746; 24/462
[58] Field of Search ................. 52/713, 710, 410, 512, 52/746; 24/459, 460, 462

[56] References Cited

U.S. PATENT DOCUMENTS

| | | | |
|---|---|---|---|
| 3,984,958 | 10/1976 | Murray | 52/410 |
| 4,532,744 | 8/1985 | Beneze et al. | 52/410 |
| 4,543,758 | 10/1985 | Lane | 52/410 |
| 4,586,301 | 5/1986 | Hickman | 52/96 |
| 4,617,771 | 10/1986 | Tomaszewski | 52/410 |
| 4,633,635 | 1/1987 | Anderson | 52/713 |

*Primary Examiner*—Michael Safavi
*Attorney, Agent, or Firm*—Richard C. Litman

[57] ABSTRACT

An anchoring system for securing an elastomeric membrane to the upper surface of a roof has a rigid anchoring plate which has a planar bottom surface, apertures to facilitate securing the anchoring plate to the roof, and a pair of raised reinforced sidewalls to aid in interlocking the device. A spacing insert is provided which employs a pair of flanges, a pair of horizontal lips, and a central hinge to snap into the anchoring plate after the membrane has been laid out over the anchoring plates. A planar wedge is also provided which includes a lip to facilitate inserting the wedge into, and withdrawing the wedge from, the spacing insert. A special fastening device is provided to secure the anchoring system to the roof surface. When the components of the present anchoring system are fitted together, an elastomeric membrane may be substantially immobilized. The structure of the device is also easily disassemable, as may become necessary in order to inspect or service the elastomeric membrane.

15 Claims, 3 Drawing Sheets

NON-PENETRATING ELASTOMERIC MEMBRANE ANCHORING SYSTEM

CROSS-REFERENCE TO RELATED APPLICATIONS

The present application is a continuation in part of U.S. patent application Ser. No. 07/172,762 filed Mar. 28, 1988, now U.S. Pat. No. 4,858,412.

FIELD OF THE INVENTION

This invention relates to an apparatus for attaching an elastomeric roofing membrane to the top surface of a roof, and more particularly to an apparatus which is capable of securing a roofing membrane without penetrating the same. Included with the apparatus is a unique fastening system to attach the apparatus to the roof.

BACKGROUND OF THE INVENTION

The traditional method used to protect roofs from rain and other forms of inclement weather was to lay down several layers of material, normally felt soaked with bitumen, thereby building up a waterproof membrane. This method has several problems, two of which are that the process is very long, and it is also susceptible to contamination by rainwater or other foreign materials. Furthermore, the bitumen must be heated to the point where it gives off noxious odors.

In recent years, alternate systems using elastomeric membranes have become increasingly popular. A suitable elastomeric membrane is laid over the top surface of the roof itself or, more preferably, an insulation board. A variety of methods for fastening the elastomeric membrane to the surface of the roof have also been developed. One method is to spread an adhesive over the entire surface of the roof before laying down the membrane. This process is very labor-intensive and requires the installers to be exposed to adhesives that give off noxious fumes.

Alternatively, the membrane can be fastened to the roof mechanically. Several devices have been developed which require that a nail or screw be allowed to penetrate the membrane. This can lead to rips and tears in the membrane, especially as the membrane expands and contracts in response to changes in the ambient temperature. These breaches in the integrity of the membrane in turn can lead to water leakage and eventual damage to the underlying roof.

A variety of other devices have also been developed which are capable of securing a membrane to the upper surface of a roof without penetrating the membrane. The applicant believes that the following references are illustrative of the non-penetrating anchoring systems which have been patented. Included in the following list of references are patents related to screw guns. These are included for being related to, but not disclosing the applicant's fastener system.

| U.S. Pat. No. | Patentee |
| --- | --- |
| 4,519,175 | Resan |
| 4,617,771 | Tomaszewski |
| 4,624,092 | Baginski |
| 4,631,887 | Francovitch |
| 4,658,558 | Verble |
| 3,960,191 | Murray |
| 3,973,605 | DeCaro |
| 4,236,555 | Dewey |

-continued

| U.S. Pat. No. | Patentee |
| --- | --- |
| 4,246,939 | Boegel |
| 4,361,997 | DeCaro |
| 4,397,412 | Dewey |
| 4,638,532 | Yang et al |
| 4,657,167 | Mays |

U.S. Pat. No. 4,519,175 issued to Resan discloses a three-piece fastening apparatus wherein the roofing membrane is laid over the bottom piece and then a second tined piece is clipped over the membrane and the protruding boss of the bottom piece. The top piece of the device is then screwed onto the second piece thereby locking the device together and securing the membrane.

U.S. Pat. No. 4,617,771 issued to Tomaszewski discloses a three-piece fastening system which snaps together. The device includes an elastic ring which provides tension when a top piece is snapped into the bottom piece.

U.S. Pat. No. 4,624,092 issued to Baginski discloses a two-piece fastening system which snaps together. The bottom piece of the device serves as the male element; the membrane is laid over the bottom piece, and a collar is snapped over the top of the bottom piece. This device, however, allows the area of the membrane directly over the bottom piece to be exposed to the atmosphere.

U.S. Pat. No. 4,631,887 issued to Francovitch discloses a three-piece fastening system which snaps together. In the use of this device, a second piece is inserted inside of the bottom piece which helps maintain the tension produced when the top, or cap piece is snapped over the membrane and the protruding boss of the bottom piece.

U.S. Pat. No. 4,638,532 issued to Yang et al discloses an anchoring plate with a hinged retainer for securing a membrane to a roof surface. The membrane is held between the anchor plate and the retainer without penetration.

U.S. Pat. No. 4,658,558 issued to Verble discloses a two-piece fastening system which snaps together. In this device, the bottom piece serves as the female piece. The bottom piece is attached to the top surface of the roof, the membrane is laid out, and the top piece is snapped into the bottom piece, thereby locking the device together and securing the membrane.

U.S. Pat. No. 3,960,191 issued to Murray discloses a driving attachment for a portable power screwdriver capable of automatically feeding fasteners to the nosepiece.

U.S. Pat. No. 3,973,605 issued to DeCaro discloses a driving tool for threaded fasteners with a washer installed on the fastener shank. Fasteners are loaded manually into the tool and guided for straight insert into the workpiece.

U.S. Pat. No. 4,236,555 issued to Dewey discloses a screw gun for driving screws up to twelve inches long from a standing position, the tool having adjustments to accomodate screws of various lengths.

U.S. Pat. No. 4,246,939 issued to Boegel discloses a screw driving apparatus for driving screws with large washers over three inches in diameter, the driver designed for use on flat roofs to retain insulation.

U.S. Pat. No. 4,361,997 issued to DeCaro discloses a fastening screw with two sets of threads. The screw is used to fasten down a plate.

U.S. Pat. No. 4,397,412 issued to Dewey discloses a screw gun for long fasteners for attaching thick insulating boards to roofs, the screw gun having provision for preventing nails being loaded backwards.

U.S. Pat. No. 4,657,167 issued to Mays discloses a fastening machine for roof and deck coverings which includes a supply magazine.

Many of these devices are capable of securing an elastomeric membrane to the upper surface of a roof without penetrating the membrane; however, there are several limitations and suboptimizations inherent in these devices and the prior art in general.

First and foremost, the way in which previously-disclosed devices generate the restraining force necessary to secure the membrane to to roof creates problems. For example, devices which screw together, such as the device disclosed by Resan in U.S. Pat. No. 4,519,175, carry with them the danger that the device will be over-tightened, thereby straining or even ripping the membrane. Alternatively, devices which screw together may be under-tightened, allowing the top, or cap piece of the device to work its way loose.

Devices which utilize the thickness of the membrane itself to generate the majority of the restraining force used to hold the device together and, hence, anchor the membrane to the roof have other problems associated with their use. Devices such as those disclosed by Verble in U.S. Pat. No. 4,658,558 and Francovitch in U.S. Pat. No. 4,631,887, in essence, call for the installer to provide the wedging force necessary to either push a cap over a protruding boss as in the case of Francovitch, or to push a plug into a housing as in the case of Verble. These types of devices can stretch and fatigue the membrane, increasing the risk that a rip will form which will allow water to pass through the membrane and damage the underlying roof structure. Furthermore, fastening devices which employ the thickness of the membrane itself to supply the majority of the tensional force necessary to keep the device locked together have very little margin for error. For example, the calender seams formed where two sheets of the roofing membrane are joined together are often too thick to fit into these types of devices. This can lead to either the necessity for careful pre-planning of the placement of the devices, or wastage of those bottom pieces which are installed too near a calender seam. Also, devices of this type that utilize base plates which are basically circular may give rise to a large number of irregularly-distributed wrinkles which gives the impression of a slovenly installation.

A second major problem with the devices disclosed by the existing patents is the difficulty of servicing these devices. After an elastomeric membrane has been installed on a roof, it may become necessary to inspect the membrane for a variety of reasons; for example, when a water leak is discovered inside the underlying structure. With the previously-patented fasteners it is almost impossible to disassemble the fastening system without damaging both the device and the membrane.

The Yang et al reference has an anchor device and hinged retainer, but lacks an insert member to maintain a tight grip on the membrane. The Yang et al patent also uses a normal screw which is separate from the anchor plate, unlike the present invention.

Of the cited screw gun systems only Boegel and Mays show applying screws to any sort of rectangular plate or washer, the screws and plates starting out as separate. In the two devices cited above the screw has to be driven into the plate or washer by the screwgun. The DeCaro device shows a screw with an attached washer, but it is quite small and is not for the same purpose as the large plate disclosed by the applicant. The screw and anchoring plate of the applicant's device come as one unit from the start.

SUMMARY OF THE INVENTION

Accordingly, it is among the objects of this invention to remedy the foregoing disadvantages by providing an improved non-penetrating anchoring system wherein the device itself supplies the majority of the locking force necessary to keep the device interlocked and the elastomeric roofing membrane stable.

A second object of the present invention is to provide a non-penetrating anchoring system which can be serviced easily and without damage to either the device or the elastomeric membrane.

A further object of the present invention is to provide a non-penetrating anchoring system which cannot be either over- or under-tightened.

A further object of the present invention is to provide a non-penetrating anchoring system which can accommodate a variety of different types of elastomeric membranes as well as the calender seams formed where two sheets of elastomeric membrane are joined.

A further object of the present invention is to provide an economical system for attaching an elastomeric roofing membrane to an existing structure without the use of special tools or extensive modification of the existing structure.

A further object of the invention is to provide a unique fastening system for attaching a membrane anchoring system to the roof.

These and other objects and advantages will become more apparent from the following detailed description taken in conjunction with the illustrative drawing figures, and the novel features thereof will be defined in the appended claims.

DESCRIPTION OF THE PREFERRED EMBODIMENT

Referring now to the drawings wherein like numbers refer to like elements throughout, the anchoring system 10 includes, in general, an anchoring plate 20, a spacing insert 40, an insert wedge 60, fastening means 70 and a driving mechanism 80.

Figure 1:
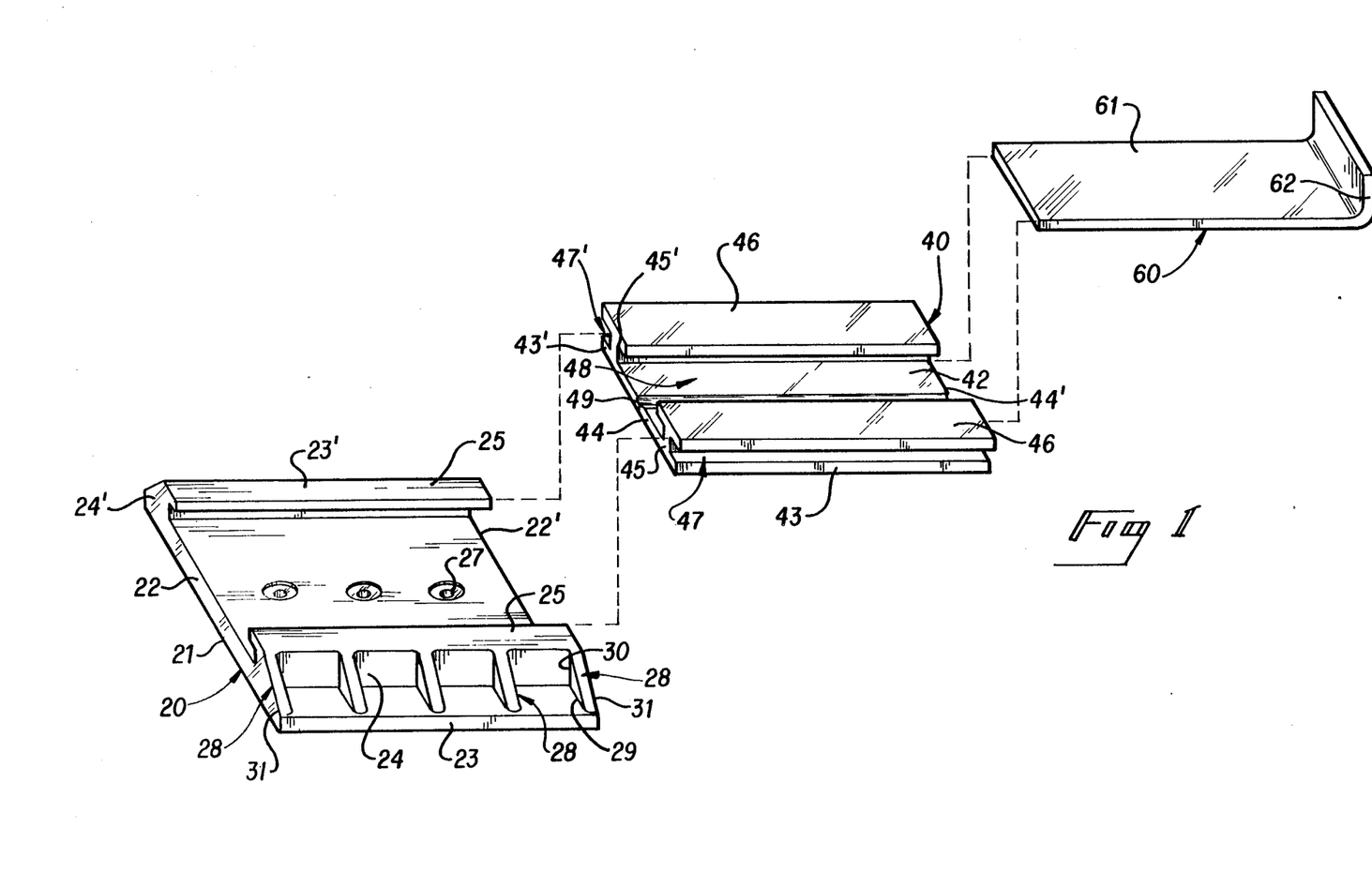
FIG. 1 is an exploded view of the present invention showing the relative positioning of the anchoring plate, spacing insert and insert wedge components thereof.

The anchoring plate 20 is rigid and, as is best shown in FIG. 1, includes a planar bottom 21 which can include cutouts (not shown) to reduce the total weight of the device. The anchoring plate 20 is rectangular in shape, having two shorter sides 22 and 22' and two longer sides 23 and 23'. Two sidewalls 24 and 24' are disposed along the two longer sides 23 and 23' of the anchoring plate 20. The sidewalls 24 and 24' each have a horizontal lip 25 which extends inwardly over the top planar surface 26 of anchoring plate 20.

Figure 3:
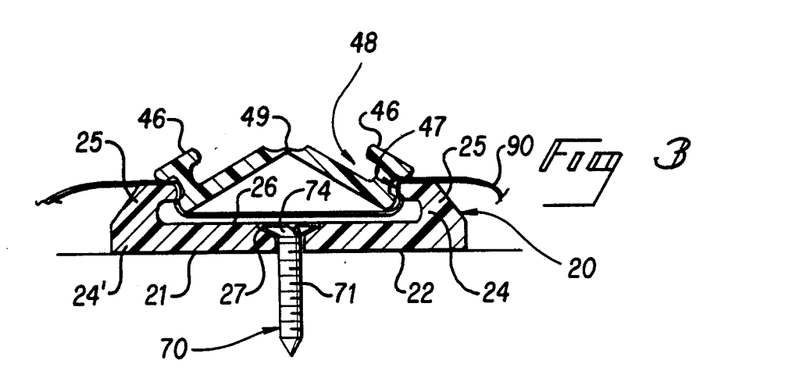
FIG. 3 is an elevational view of the present invention in cross section showing the spacing insert being inserted within the anchoring plate.

The anchoring plate 20 is provided with a plurality of apertures 27 to facilitate securing the anchoring plate 20 to the top surface of a roof (for example, by a screw or other fastening means 70; in FIG. 1, three apertures 27 are shown, but clearly a different number of apertures could be utilized). As shown in FIG. 3, the apertures 27 are counterbored to allow the fastening means 70 to be tightened down to the point where the heads of the screws are beneath the top planar surface 26 of the anchoring plate 20, thereby assuring that the membrane 90 will not be abraded by the tops of the fastening means 70.

The anchoring plate 20 also includes a plurality of triangular braces 28 which are mounted perpendicularly to, and outside of, each of the sidewalls 24 and 24' (in FIG. 1, five triangular braces 28 are shown, but clearly a different number of braces could be utilized). The triangular braces 28 are mounted on the anchoring plate 20 in such a way that a first side 29 runs along the top surface 26 of the anchoring plate 20, and a second side 30 runs the height of the sidewalls 24 and 24'. These two sides 29 and 30 of the triangular braces 28 are by definition perpendicular to each other. Hence, the hypotenuse 31 of each triangular brace 28 runs from the outside edge of one of the longer sides 23 and 23' of the anchoring plate 20 to the top outside edge of the sidewalls 24 and 24'; in other words, to the point where the sidewalls 24 and 24' intersect with the horizontal lip 25.

The second component of the anchoring system 10 is a spacing insert 40. The spacing insert 40 has a planar bottom surface 41 and top surface 42. Like the anchoring plate 20, the spacing insert 40 is rectangular in shape, having two longer sides 43 and 43' and two shorter sides 44 and 44'. A pair of vertical flanges 45 and 45' are disposed parallel to the longer sides 43 and 43' of the spacing insert 40. The flanges 45 and 45' are positioned near, but not at, the outer edges of the spacing insert 40.

Each of the flanges 45 and 45' has a lip 46 mounted on its top. The lip 46 is parallel to the planar top surface 42 of the spacing inset 40 and extends both inwardly and outwardly from the flanges 45 and 45'. The exterior portion of each lip 46 extends out beyond the edge of the two longer sides 43 and 43' of the spacing insert 40, and when considered in conjunction with the exterior face of the flanges 45 and 45' and the portion of the top surface 42 of the spacing insert 40 outside of the flanges 45 and 45', forms a C-shaped notch 47 and 47'.

The portion of the lips 46 which extends inwardly from the flanges 45 and 45', when taken in conjunction with the portion of the planar top surface 42 of the spacing insert 40 which is disposed between the two flanges 45 and 45', forms a substantially rectangular-shaped cavity 48 into which the insert wedge 60 is inserted, to conform to the configuration of the flanges 45 and 45' of the spacing insert 40 and thereby provide sufficient rigidity to the device, thus providing an anchoring system 10 capable of securely fastening an elastomeric membrane 90 to the top surface of a roof.

The spacing insert 40 also includes a hinge 49 which is disposed parallel to, and midway between, the flanges 45 and 45'. In the preferred embodiment, as is best shown in FIG. 1, the hinge 49 is a groove which runs from one of the shorter sides 44 of the spacing insert 40 to the other short side 44. As is best shown in FIG. 3, this hinge 49 provides a line of flexure along which the spacing insert 40 can be flexed to aid in inserting the spacing insert 40 within the anchoring plate 20.

The third major component of the present anchoring system 10 is an insert wedge 60. The insert wedge 60, like the spacing insert 40 and anchoring plate 20, is preferably formed of substantially rigid plastic. The insert wedge 60 has a planar bottom member 61 which can be inserted within the substantially rectangular-shaped cavity 48 of the spacing insert 40, as will be more fully described hereinafter.

Figure 4:
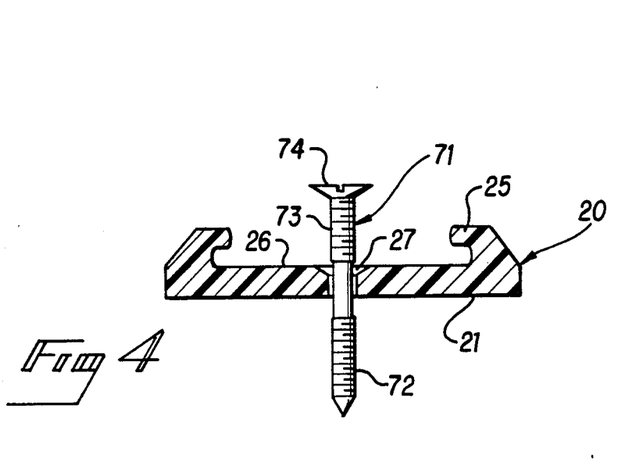
FIG. 4 is an elevational view of the present invention in cross section showing the anchor plate with special fastener.

Finally, the anchoring system 10 utilizes appropriate fastening means 70, shown in FIG. 4, to secure the anchoring plate 20 to the upper surface of the roof. It comprises an elongated screw 71 with threads 72,73 at either end. The bottom threads 72 being greater in area along the screw 71 length. Lower screwthreads 72 serve to hold the anchor plate 20 to the roof while screwthreads 73 serve to anchor the screw 71 to the anchor plate 20. Screwhead 74 mates with the end 89 of a screwdriver 85.

Figure 5:
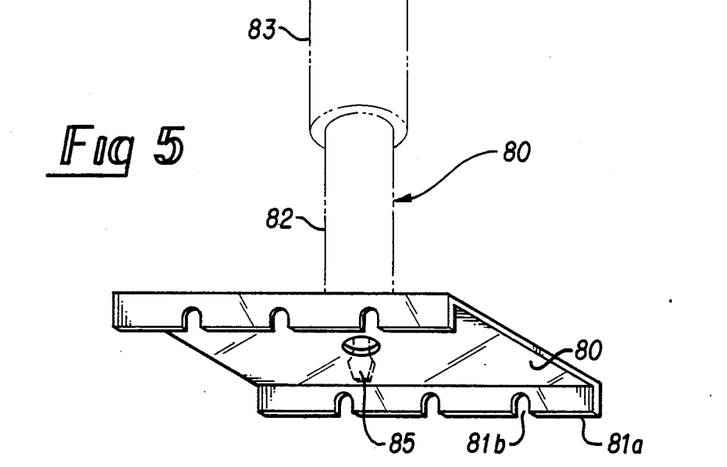
FIG. 5 is a perspective view showing the driving mechanism.

Driving mechanism 80, shown in FIG. 5, used to drive screw 71 comprises a rectangular base 81 with side flanges 81a and notches 81b that fit over the anchor plate 20 to retain and stabilize the driving mechanism 80 and the anchor plate 20 while driving the screw 71. Notches 81b would fit over braces 28 to secure the position of the plate. Concentric housing tubes 82 and 83 containing the driver 85 could be spring biased. The tubes would be pushed together to expose the driver in order to drive in screw 71. A power tool would engage the driver head to rotate the driver 85 and the engaged screw 71. The screw is driven in completely until screwhead 74 is in the countersunk aperture 27. Of course, conventional screws 70 could also be used as shown in FIG. 3 instead of the special fastener described above.

Figures 6, 7:
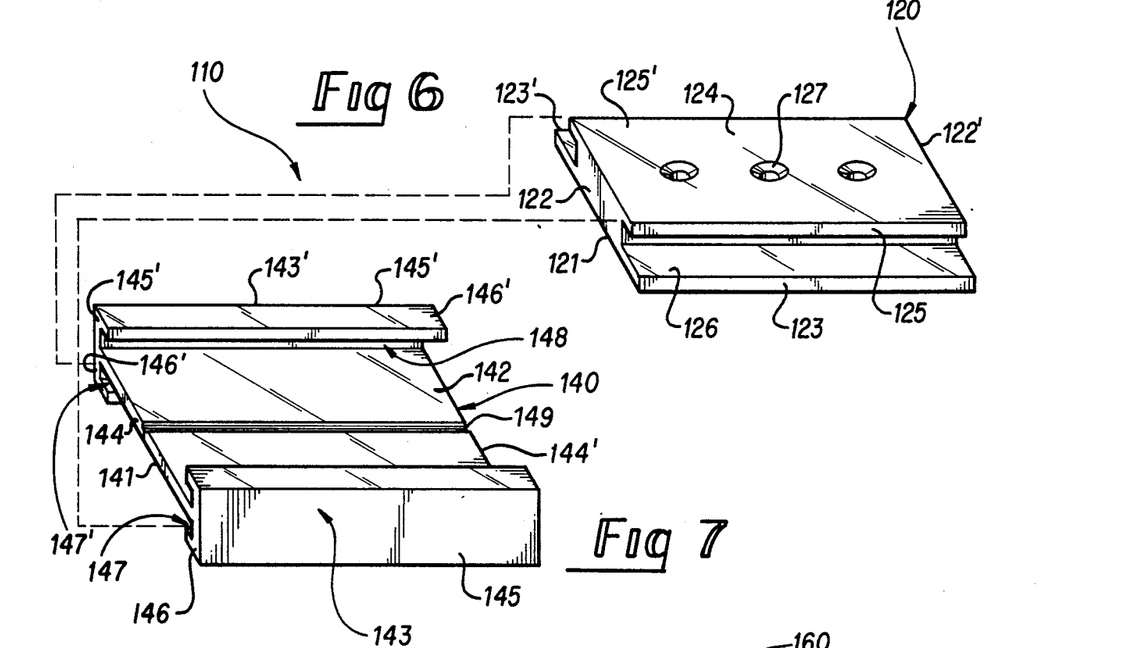
FIGS. 6 and 7 are an exploded view of an alternate embodiment of the present invention showing the relative positioning of the various components including the anchor plate, retainer and retainer wedge.

A second embodiment of the anchoring system 110 is shown in FIGS. 6 and 7. It consists of anchoring plate 120 with top surface 126 and bottom surface 121. Mounted on the top surface 126 is a straight ridge 124 that extends between the short sides 122,122' of the anchoring plate 120 and in the middle between longer sides 123,123'. Ridge 124 is flat on top and has a plurality of apertures 127 disposed along its length. These apertures extend vertically downward to the planar bottom 121 as before to accept fasteners 70. Counterbores are also provided to prevent damaging the membrane 90. Extending outward away from the ridge 124 and parallel to the anchor plate 120 are flanges 125,125'. The space formed between the flanges 125,125' and the anchor plate 120 will serve to accept the retainer 140.

Figure 8:
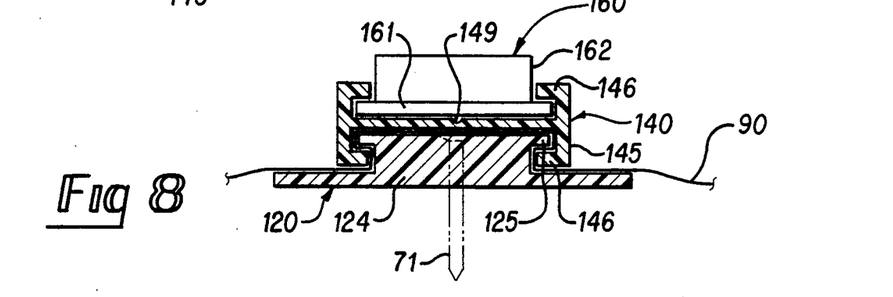
FIG. 8 is an elevational view of the present invention in cross section showing the alternate embodiment assembled together.

Retainer 140 serves to cover the membrane 90 over anchor plate 120. It consists of a flat plate with top surface 142 and bottom surface 141. A hinge 149 extends down the middle of longer sides 143,143' as before. Mounted on the longer sides 143,143' perpendicular to the top surface 142 are flanges 145,145'. These extend on both sides of the retainer plate. On the bottom side of the flanges 145,145' are lips 146,146', forming cavities 147,147', which face inward parallel to the bottom surface 141. These lips 146,146' are disposed in the notches formed between the flanges 125,125' and the anchor plate top surface 126. The top side of the flanges 145,145' have lips 146,146' that form a cavity 148 to accept insert wedge 160 as shown in FIG. 8.

As before an insert wedge 160 is slid into the cavity 148 to maintain the whole device under tension. This allows for a tight fit for membrane 90 so that it does not loosen.

OPERATION

The first step in assembling and utilizing the present anchoring system 10 (disregarding those steps necessary to prepare the upper surface of a roof for installation) is to fasten the anchoring plate 20 to the surface of a roof. As is shown in FIG. 3, this can be done by inserting screws 71 through the apertures 27 in the top surface 26 of the anchoring plate 20. It is important that the screw 71 be fully tightened down in order that the membrane 90 not be abraded by the screwhead 74. As is best seen in FIG. 3, the apertures 27 are formed in such a way that the screwhead 74 can be counterbored beneath the top surface of the anchoring plate 20.

The next step in utilizing the anchoring system 10 of the present invention is to spread the elastomeric membrane over the upper surface of the roof and, hence, the anchoring plates 20. As will be more fully discussed hereinafter, the thickness of the membrane at those places where it overlays the anchoring plate 20 determines the way in which the spacing insert 40 is positioned within the anchoring plate 20. For example, at the calender seams formed where adjacent rolls of elastomeric membrane are jointed together, the effective thickness of the membrane will be twice as great as in places where anchoring plates 20 have been positioned beneath the middle of a sheet of the membrane 90. Furthermore, in some situations, for example, in high-wear installations, it may be desirable to utilize a heavier-than-normal membrane (for example, 60 mils instead of the normal 45 mil membrane).

For example, the relative positioning seen between the anchoring plate 20 and spacing insert 40 in FIG. 3, i.e., with the lips 46 above the upper planar surface 41 of the spacing insert 40, would be utilized to secure relatively thicker portions of the membrane 90 (e.g., calender seams in thin membranes which are normally 90 mils thick, or thicker membranes which are normally 60 mils thick). This configuration is used in this context because the lips 46 attached to the tops of the flanges 45 and 45' extend outwardly (i.e., away from the central hinge 49) further than the two longer sides 43 and 43' of the spacing insert 40.

The relative positioning shown in FIG. 2, on the other hand (i.e., with the lips 46 of the flanges 45 and 45' positioned below the top planar surface 41 of the spacing insert 40) is utilized where a relatively thinner section of membrane 90 has been positioned over the anchoring plate 20 (e.g., a single thickness of membrane, which usually has a thickness of approximately 45 mils).

Figure 2:
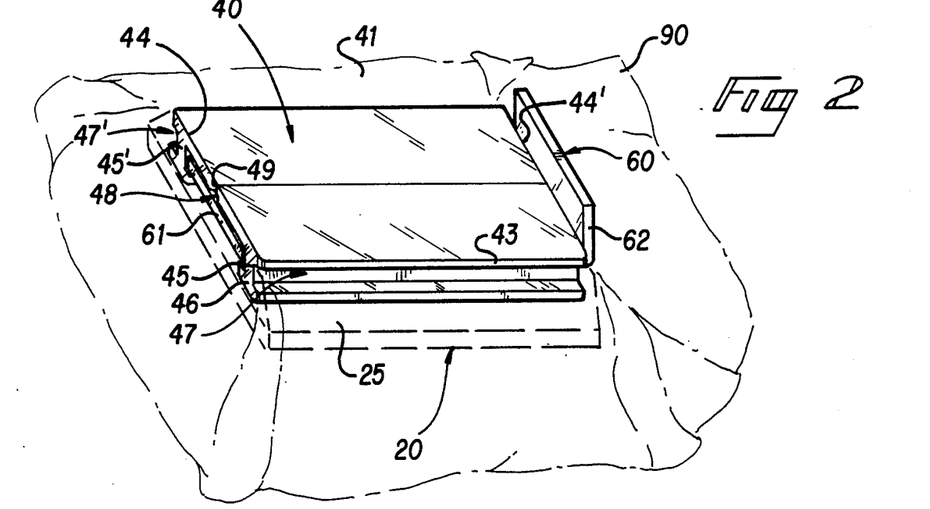
FIG. 2 is a perspective view showing the constituent components of the present invention assembled, and in the process of securing an elastomeric membrane.

Since the two longer sides 43 and 43' of the spacing insert 40 do not extend outwardly as far as the lips 46 mounted at the ends of the flanges 45 and 45', the configuration shown in FIG. 2, wherein the lips 46 are inserted beneath the horizontal lips 25 of the anchoring plate 20, exerts more pressure on the elastomeric membrane and, hence, generates more retaining force than the configuration shown in FIG. 3, wherein the two longer sides 43 and 43' of the spacing insert 40 are inserted beneath the horizontal lips 25,25' of the anchoring plate 20.

In either configuration, the insertion of the spacing insert 40 within the anchoring plate 20 is made possible by the hinging action of the spacing insert 40. The hinging action of the spacing insert 40 is in turn made possible by the central hinge 49 of the spacing insert 40. In FIG. 3, the hinge 49 is shown as a groove within the top planar surface 42 of the spacing insert 40, running from one of the two shorter sides 44 and 44' to the other, but as will be appreciated by those skilled in the relevant art, other mechanisms could be employed.

Once the spacing insert has been snapped into place by applying pressure along the hinge 49, as is shown in FIG. 3, the horizontal lips 25 of the anchoring plate 20 will fit within the C-shaped notches 47 and 47' formed as part of the spacing insert 40 by the portion of the lips 46 extending outwardly from the flanges 45 and 45', taken in conjunction with the outer face of the flanges 45 and 45', and the portion of the top planar surface 42 of the spacing insert 40 outside of the flanges 45 and 45', in a tongue-and-groove fashion which is capable of reliably securing and immobilizing the elastomeric membrane 90 within the anchoring plate 20.

In either configuration, that is, when the substantially rectangular-shaped cavity 48 of the spacing insert 40 is pointed either upwardly or downwardly, the final step in utilizing the present anchoring system 10 is to to insert the insert wedge 60 within the substantially rectangular-shaped cavity 48 of the spacing insert 40 and thereby interlock the components of the anchoring system 10 in a secure fashion. The insert wedge 60, therefore, is inserted into the substantially rectangular-shaped cavity 48 in such a way that the bottom member 61 of the insert wedge 60 becomes positioned between the bottom of the flanges 45 and 45' and the top planar surface 42 of the spacing insert 40, as is seen in FIG. 2. The orientation of spacing insert 40 within the anchoring plate 20 depends upon the configuration—that is, with the flanges 45 and 45' pointing up (as shown in FIG. 3, as is used with thicker portions of the membrane 90); the insert wedge 60 is positioned in the same basic fashion (i.e., with the bottom member 61 inserted between the flanges 45 and 45' and the top planar surface 42 of the spacing insert 40).

The insertion of the insert wedge 60 within the substantially rectangular-shaped cavity 48 of the insert wedge 40 is facilitated by a lip 62 disposed perpendicularly to the bottom member 61. The lip 62 can be, for example, hit by a mallet or kicked gently by a worker's boot in order to drive the insert wedge 60 into the rectangular-shaped cavity 48 of the spacing insert 40.

The operation of the second embodiment 110 is similar in fashion to that of anchor system 10. The main difference being that the retainer 140 is not inserted, but is now placed on the outside of anchor plate ridge 124. Membrane 90 would be over the ridge 124 and under the retainer bottom surface 141. Lips 146,146' and flanges 125,125' serve grip the membrane 90 and keep it in position without shifting. As before, fastening means 70 is first applied to secure the anchor plate 120 to the roof before membrane 90 is placed over and the retainer 140 placed further on top of the membrane 90.

A similar driving mechanism 80 can be used to drive screw 71 into anchor plate 120. The side flanges 81a would have to be longer in order to accomodate the height of the central ridge 124.

The process of disassembling the present anchoring system 10 or 110, as may become desirable in order to inspect or repair the membrane 90, is similarly easy to accomplish and is begun by using a mallet to drive the insert wedge 60 out of the rectangular-shaped cavity 48 of the spacing insert 40.

The foregoing description of the preferred embodiment of the present invention is to be considered as illustrative only. Furthermore, since numerous modifications and variations will readily occur to those skilled in the relevant art, it is not desired to limit the scope of the present invention to the exact construction and operation shown and described and, accordingly, all suitable modifications and equivalents which fall within the scope of the claims may be resorted to.

I claim:

1. An anchoring system for fastening an elastomeric membrane to the upper surface of a roof without puncturing the membrane, comprising:

(a) a rigid anchoring plate having a top planar surface having outside edges and a pair of spaced-apart raised sidewalls having a top outside edge on said top planar surface over which an elastomeric membrane may be laid, said sidewalls each having a retaining lip extending inwardly from said sidewalls over, and substantially parallel to, said top planar surface for aiding in the retention of a spacing insert, and at least one aperture disposed within said top planar surface for facilitating the securing of said anchoring plate to said upper surface of a roof;

(b) a hinged spacing insert having a planar top and bottom surface with outer edges arranged to be inserted within said anchoring plate; a pair of spaced-apart, raised flanges having interior and exterior faces disposed parallel to each other and positioned on said top surface near, but not at, the outer edges of the top surface of said spacing insert, said flanges on said top surface thereby dividing said top surface into three regions that consist of an interior region between said flanges, and two exterior regions outside of each of said flanges; said flanges each having a retaining lip extending over and substantially parallel to said top surface, both inwardly and outwardly from said flanges, the inwardly extending portions of said lips, along with said interior faces of said flanges and said interior region of said top surface of said spacing insert, thereby defining a substantially rectangular-shaped cavity into which an insert wedge may be slid to aid in securely interlocking said anchoring system; the outwardly extending portions of said lips, along with said exterior faces of said flanges and said exterior regions of said top surface of said spacing insert thereby defining a pair of C-shaped notches for snappingly engaging the retaining lips of said anchoring plate after said elastomeric membrane has been laid over said anchoring plate; and, hinging means disposed within said top and bottom planar surfaces of said spacing insert parallel to, and equidistant from, said flanges, said hinging means thereby forming a line of flexure along which said insert is thereby divided into two mirror-symmetrical halves;

(c) an insert wedge having a planar top and bottom surface and a raised lip disposed along one edge of said wedge perpendicular to said top and bottom surfaces for grasping and thereby facilitating the insertion of said wedge within said substantially rectangular-shaped cavity within said hinged spacing insert; and, (d) fastening means for securely attaching said anchoring plate to said upper surface of a roof, including an elongated threaded member, said elongated threaded member partially disposed through and affixed to one of said apertures normal to said anchor plate, said elongated threaded member consisting of a shank having a head and oppositely disposed leading end, screw threads disposed only on said leading end and adjacent said head.

2. The anchoring system disclosed in claim 1 wherein said anchoring plate includes at least one aperture for facilitating the securing of said anchoring plate to said upper surface of a roof, said aperture being formed in such a way that it is possible to countersink the top of said fastening means below the top of said planar surface, over which said elastomeric membrane is placed.

3. The anchoring system disclosed in claim 1 wherein said anchoring plate includes a plurality of bracing means disposed perpendicular to, and outside of, said sidewalls for bracing said sidewalls of said anchoring plate.

4. The anchoring system of claim 3 wherein said bracing means is a plurality of braces, said braces being triangular in shape and disposed such that a first side of each of said triangular braces is disposed adjacent to said sidewalls, a second side of said triangular braces is disposed adjacent to the top planar surface of said anchoring plate, and the third side of said triangular braces is disposed such that said third side connects the outside edge of the top planar surface of said anchoring plate with the top outside edge of said sidewalls.

5. The anchoring system of claim 1 wherein said hinging means is a groove formed within the top planar surface of said spacing insert disposed such that said groove runs from one end of said spacing insert to an opposite end of said spacing insert, between and parallel to said flanges, said hinging means useful in facilitating said insertion of said spacing insert within said anchoring plate.

6. The anchoring system as disclosed in claim 1 wherein said anchoring plate is rectangular in shape having two longer sides, said sidewalls being disposed along said two longer sides of said rectangular anchoring plate.

7. The anchoring system disclosed in claim 1 wherein said spacing insert is rectangular in shape having a pair of oppositely disposed longer sides, said flanges being disposed along said longer sides of said rectangular spacing insert.

8. The anchoring system disclosed in claim 1 wherein said insert wedge is rectangular in shape having two shorter sides, said raised lip being disposed along one of the two shorter sides of said rectangular insert wedge.

9. An anchoring system for fastening an elastomeric membrane to the upper surface of a roof without puncturing the membrane, comprising;

(a) a rigid anchoring plate having a top planar surface having outside edges and a flat raised central ridge over which an elastomeric membrane may be laid, said central ridge having flanges extending away from each side of said ridge over and parallel to said planar surface for aiding in the retention of a retainer, and at least one aperture disposed within said central ridge for facilitating the securing of said anchoring plate to said upper surface of a roof;

(b) a hinged retainer having a planar top and bottom surface and outer edges, a pair of flanges disposed on two of said outer edges facing one another parallel, said flanges extending normal to said planar surfaces on either side of said planar surfaces, said flanges each having a retaining lip extending inwardly over and parallel to said planar bottom surface defining a substantially rectangular cavity into which said anchor plate flanges are snappingly inserted to retain said elastomeric membrane, the flanges also having lips extending inwardly over and parallel to said top planar surface defining another rectangular cavity into which a retainer wedge may be slid to aid in securely interlocking said anchoring system; hinging means disposed within said top and bottom planar surfaces of said retainer parallel to and equidistant from said flanges, said hinging means thereby forming a line of flexure along which said retainer is thereby divided into two mirror-symmetrical halves;

(c) a retainer wedge having a planar top and bottom surface and a raised lip disposed along one edge of said wedge perpendicular to said top and bottom surfaces for grasping and facilitating the insertion of said wedge within said substantially rectangular shaped cavity within said hinged retainer; and (d) fastening means for securely attaching said anchoring plate to said upper surface of a roof, including an elongated threaded member, said elongated threaded member partially disposed through and affixed to one of said apertures normal to said anchor plate, said elongated threaded member consisting of a shank having a head and oppositely disposed leading end, screw threads disposed only on said leading end and adjacent said head.

10. The anchoring system disclosed in claim 9 wherein said anchoring plate ridge includes at least one aperture for facilitating the securing of said anchoring plate to said upper surface of a roof, said aperture being formed in such a way that it is possible to countersink the top of said fastening means below the top of the flat surface of said central ridge, over which said elastomeric membrane is placed.

11. The anchoring system of claim 9 wherein said hinging means is a groove formed within the top planar surface of said retainer disposed such that said groove runs from one end of said retainer, between and parallel to said flanges, said hinging means useful in facilitating said engagement of said retainer with said anchoring plate.

12. The anchoring system as disclosed in claim 9 wherein said anchoring plate is rectangular in shape having two longer sides, said flat central ridge being disposed equidistant between and parallel said longer sides of said rectangular anchoring plate.

13. The anchoring system disclosed in claim 9 wherein said retainer is rectangular in shape having a pair of oppositely disposed longer sides, said retainer flanges being disposed along said longer sides of said rectangular retainer.

14. The anchoring system disclosed in claim 9 wherein said retainer wedge is rectangular in shape having two shorter sides, said raised lip being disposed along one of the two shorter sides of said rectangular retainer wedge.

15. A method of installing an anchoring system for fastening an elastomeric membrane to the upper surface of a roof without puncturing the membrane, comprising the following steps:

placing a rigid anchoring plate onto the upper surface of a roof, said anchoring plate having a top planar surface having outside edges and a pair of spaced-apart raised sidewalls having a top outside edge on said top planar surface over which an elastomeric membrane may be laid, said sidewalls each having a retaining lip extending inwardly from said sidewalls over, and substantially parallel to, said top planar surface for aiding in the retention of a spacing insert, and at least one aperture disposed within said top planar surface for facilitating the securing of said anchoring plate to said upper surface of a roof;

disposing through one of said at least one apertures a fastening means comprising an elongated threaded member, said elongated threaded member consisting of a shank having a head and oppositely disposed leading end, screw threads disposed on said elongated shank;

driving said fastening means through said aperture and securing said anchoring plate to said roof by utilizing a driving mechanism, said driving mechanism including an elongated driver means for driving said fastener means into the roof and affixing said anchoring plate, housing means for said driver means, said housing means comprising a housing tube having an open end, a rectangular base disposed at the open end of said housing tube, said rectangular base retaining and covering said anchoring plate when fastening said anchoring plate to the roof, said driver means disposed within said tube and able to be exposed out of said housing tube open end in order to drive said fastener means;

placing said elastomeric membrane over said anchoring plate;

placing and engaging a hinged spacing insert over said anchoring plate and said elastomeric membrane, said spacing insert having a planar top and bottom surface with outer edges arranged to be inserted within said anchoring plate, a pair of spaced-apart, raised flanges having interior and exterior faces disposed parallel to each other and positioned on said top surface near, but not at, the outer edges of the top surface of said spacing insert, said flanges on said top surface thereby dividing said top surface into three regions that consist of an interior region between said flanges, and two exterior regions outside of each of said flanges, said flanges each having a retaining lip extending over and substantially parallel to said top surface, both inwardly and outwardly from said flanges, the inwardly extending portions of said lips, along with said interior faces of said flanges and said interior region of said top surface of said of said spacing insert, thereby defining a substantially rectangular-shaped cavity into which an insert wedge may be slid to aid in securely interlocking said anchoring system, the outwardly extending portions of said lips, along with said exterior faces of said flanges and said exterior regions of said top surface of said spacing insert thereby defining a pair of C-shaped notches for snappingly engaging the retaining lips of said anchoring plate after said elastomeric membrane has been laid over said anchoring plate, and, hinging means disposed within said top and bottom planar surfaces of said spacing insert parallel to, and equidistant from, said flanges, said hinging means thereby forming a line of flexure along which said insert is thereby divided into two mirror-symmetrical halves;

inserting an insert wedge into said rectangular shaped cavity within said hinged spacing insert, said insert wedge having a planar top and bottom surface and a raised lip disposed along one edge of said wedge perpendicular to said top and bottom surfaces for grasping and thereby facilitating the insertion of said wedge within said rectangular-shaped cavity.

* * * * *